M. Allcutt,
Cant Dog.
Nº 16,282.  Patented Dec. 16, 1856.

UNITED STATES PATENT OFFICE.

MARK ALLCUTT, OF HANCOCK, NEW HAMPSHIRE.

ADJUSTABLE CANT-HOOK FOR MOVING LOGS, &c.

Specification of Letters Patent No. 16,222, dated December 16, 1856.

*To all whom it may concern:*

Figure 1:
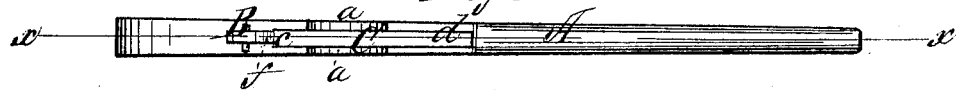
Figure 2:
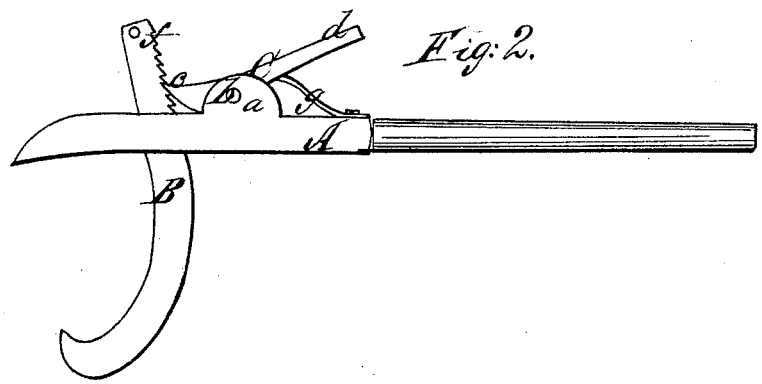
Figure 3:
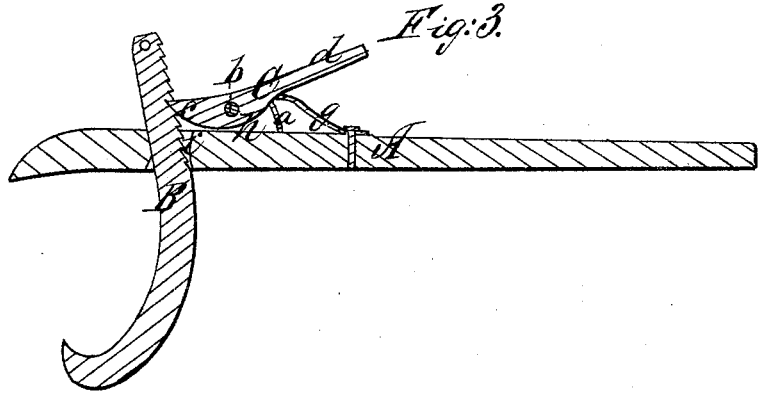

Be it known that I, MARK ALLCUTT, of Hancock, in the county of Hillsboro and State of New Hampshire, have invented a new and Improved Cant-Hook for Turning and Moving Logs, Stone, Boxes, Bales, &c.; and I do hereby declare that the following is a full and exact description thereof, reference being had to the accompanying drawings, making part of this specification, Figure 1 being a top view of the instrument; Fig. 2, a side view thereof; Fig. 3, a longitudinal vertical section in the plane $x$ $x$ of Fig. 1.

Like letters designate corresponding parts in all the figures.

I employ a lever A, of suitable size, and having nearly the form ordinarily possessed by cant-hook levers. The hook B, may also have the ordinary form, except its shank, which I construct longer than usual, and provide it with a set of ratch notches $f$, in the rear edge, as shown in the drawings. Through the lever A, and at the proper distance from the fulcrum end, is formed a slot $i$, of the form shown in Fig. 3, viz., with rounded ends. The length of the slot in the middle of the lever, should be just sufficient to allow the shank of the hook to slide freely up and down therein. At the same time, by the flaring mouths of the slot, the hook can vibrate a considerable distance lengthwise of the lever. Behind the hook B, a pawl, or detent, C, is pivoted between two ears $a$, $a$, which project from the top of the lever A. The situation of the pivot $b$, and the shape of the pawl, are such that the point $c$, of the pawl will enter any of the notches $f$, of the hook B, and hold the hook from being drawn down through the lever, by the lower edge of said pawl bearing upon the top of the lever, as seen at $h$, Fig. 3. But the hook may be drawn down as far as desired, by depressing the handle $d$, of the pawl, and thus disengaging its point from the ratch notches $f$. And the hook may be raised by simply pushing it up, the pawl yielding thereto. A slight spring $g$, may be placed under the rear end, or handle, of the pawl, to keep the point in the notches of the ratch.

A cant-hook thus constructed can be, almost in a moment, adjusted to a log, stone, or box, of any size within the limits of its capability. Hence its utility, and facility of operation, are very much increased; for cant-hooks of common construction are either incapable of adjustment to different sizes, or the hook can only be shifted to two or three different pivot points, and those only by withdrawing the pivot and inserting it again.

What I claim as my invention and desire to secure by Letters Patent, is—

The arrangement and combination of the lever with its pawl and slot, and the hook with its ratch notches, substantially as described, and composing an improved cant-hook, as specified.

The above specification, signed, by me, this eleventh day of October, 1856.

MARK ALLCUTT.

Witnesses:
WILLIAM WHITTEMORE,
CYRUS W. ALLCUTT.